(12) United States Patent
Simula et al.

(10) Patent No.: US 8,540,040 B2
(45) Date of Patent: Sep. 24, 2013

(54) MULTI-PURPOSE GROUND VEHICLE

(75) Inventors: Glen Raymond Simula, Hancock, MI (US); Luke Stephen Luskin, Hubbell, MI (US); David Jon McKinstry, Calumet, MI (US)

(73) Assignee: GSE Technologies, LLC, Houghton, MI (US)

( * ) Notice: Subject to any disclaimer, the term of this patent is extended or adjusted under 35 U.S.C. 154(b) by 1273 days.

(21) Appl. No.: 11/936,137

(22) Filed: Nov. 7, 2007

(65) Prior Publication Data

US 2011/0036650 A1 Feb. 17, 2011

(51) Int. Cl.
*B62D 55/075* (2006.01)

(52) U.S. Cl.
USPC .................... 180/9.46; 180/9.5; 180/9.52

(58) Field of Classification Search
USPC ............... 180/9.28, 9.32, 9.46, 9.5, 9.52, 193
See application file for complete search history.

(56) References Cited

U.S. PATENT DOCUMENTS

| | | | | |
|---|---|---|---|---|
| 2,998,998 | A * | 9/1961 | Hyler et al. ................... | 305/145 |
| 3,182,741 | A * | 5/1965 | Roach ............................ | 180/9.5 |
| 3,609,804 | A * | 10/1971 | Morrison ......................... | 180/9 |
| 3,792,745 | A | 2/1974 | Files | |
| 3,933,213 | A * | 1/1976 | Trowbridge .................. | 180/193 |
| 4,068,732 | A * | 1/1978 | Granryd ........................ | 180/6.7 |
| 4,445,582 | A | 5/1984 | Anderson | |
| 4,702,331 | A * | 10/1987 | Hagihara et al. ............. | 180/9.32 |
| 4,747,457 | A | 5/1988 | Buscaiolo et al. | |
| 4,977,971 | A | 12/1990 | Crane, III et al. | |
| 5,174,405 | A | 12/1992 | Carra et al. | |
| 5,248,008 | A | 9/1993 | Clar | |
| 5,337,846 | A * | 8/1994 | Ogaki et al. ................... | 180/8.2 |
| 5,337,847 | A * | 8/1994 | Woods et al. ................ | 180/9.52 |
| 5,409,075 | A | 4/1995 | Nieman | |
| 5,505,274 | A * | 4/1996 | Satzler .......................... | 180/9.5 |
| 5,622,234 | A * | 4/1997 | Nagorcka et al. ............. | 180/9.5 |
| 5,988,775 | A * | 11/1999 | Nordberg ..................... | 305/143 |
| 6,012,724 | A | 1/2000 | Pitkanen | |
| 6,394,204 | B1 * | 5/2002 | Haringer ..................... | 180/9.52 |
| 6,655,482 | B2 * | 12/2003 | Simmons ...................... | 180/9.1 |
| 6,774,597 | B1 | 8/2004 | Borenstein | |
| 7,131,651 | B2 * | 11/2006 | Laursen ..................... | 280/6.154 |
| 7,348,747 | B1 * | 3/2008 | Theobold et al. ......... | 318/568.21 |
| 7,492,074 | B1 * | 2/2009 | Rittenhouse ................. | 310/265 |
| 7,520,348 | B2 * | 4/2009 | Bergsten et al. ............. | 180/9.3 |
| 7,562,727 | B1 * | 7/2009 | Hoffart .......................... | 180/9.1 |

(Continued)

OTHER PUBLICATIONS

International Search Report, International Application No. PCT/US2008/081690m mailed Apr. 23, 2009.

(Continued)

*Primary Examiner* — Anne Marie Boehler
*Assistant Examiner* — Maurice Williams
(74) *Attorney, Agent, or Firm* — Brooks Kushman P.C.

(57) ABSTRACT

The invention relates to a multi-purpose ground vehicle (10) that may serve as a platform (12) for carrying a payload (14). The vehicle has a chassis (16) and a suspension (18) mounted to the chassis (16) for varying ride height and for influencing a response of the chassis (16) to underlying terrain. Track modules (22, 24, 26, 28) are associated for the suspension. These modules (22, 24, 26, 28) can be reoriented independently of each other. Preferably, at least some of the track modules (22, 24, 26, 28) include a band track (38) that circumscribe one or more wheels (30, 32) that are associated with a given track module (22, 24, 26, 28).

12 Claims, 10 Drawing Sheets

(56) References Cited

U.S. PATENT DOCUMENTS

| | | | |
|---|---|---|---|
| 7,597,161 B2 * | 10/2009 | Brazier | 180/9.3 |
| 7,654,348 B2 * | 2/2010 | Ohm et al. | 180/9.32 |
| 7,690,738 B2 * | 4/2010 | Wilt | 305/133 |
| 7,922,266 B2 * | 4/2011 | Dietrich | 305/145 |
| 2002/0070059 A1 * | 6/2002 | Hikari et al. | 180/9.5 |
| 2002/0189871 A1 * | 12/2002 | Won | 180/9.32 |
| 2002/0190575 A1 * | 12/2002 | Dom | 305/165 |
| 2003/0221879 A1 * | 12/2003 | Bowers et al. | 180/9.5 |
| 2005/0087374 A1 * | 4/2005 | Kanzler et al. | 180/9.5 |
| 2006/0145433 A1 * | 7/2006 | Kim | 280/5.28 |
| 2007/0107950 A1 * | 5/2007 | Ki | 180/9.5 |
| 2008/0223630 A1 * | 9/2008 | Couture et al. | 180/9.32 |
| 2010/0021234 A1 * | 1/2010 | Willis et al. | 404/90 |

OTHER PUBLICATIONS

International Preliminary Report on Patentability; International Application No. PCT/US2008/081690; dated May 11, 2010.

* cited by examiner

MULTI-PURPOSE GROUND VEHICLE

STATEMENT REGARDING FEDERALLY SPONSORED RESEARCH OR DEVELOPMENT

The invention was made with Government support under SBIR Contract No. W56 HZV-04-C-0129. The Government may have certain rights to the invention.

BACKGROUND OF THE INVENTION

1. Field of the Invention

The invention generally relates to a ground vehicle with track modules for carrying a payload. More particularly, the vehicle can be deployed on uneven terrain, can assume a low profile for passing under an obstacle and can assume a raised profile for traversing obstacles.

2. Background Art

Manned and unmanned vehicles may be suitable for deployment in peaceful and hostile environments. Conventionally, wheeled vehicles can be adapted for travel over inclined and flat roads and pathways. Practically, however, it may be necessary for a vehicle to pass over or through an environment that may include obstacles, barricades and steps, especially if the environment is a hostile terrain or war zone. Many conventional vehicles are unsuitable in such environments because the vehicles may be unable to reliably cross fractured or debris-strewn terrain.

Some solutions have included equipping vehicles with large diameter wheels or crawler tracks that may enable the vehicle to circumnavigate or traverse large objects or surface discontinuities. But such approaches typically involve adding to the overall dimensions of the vehicle, which in turn may entail reducing its ability to travel through restricted gaps and add to vehicle weight.

If the vehicle is required to traverse a steep slope, there is an increasing chance that it may roll over. If so, a propulsion unit, such as a wheel or track may become disassociated from the terrain and thus may be unable to propel the vehicle any further.

Various entities have developed vehicles which respond to the requirement for such vehicles. They include Lockheed Martin's "FCS MULE"; the "Tags-CX" vehicle (a joint project of Applied Perception, Inc., Cranberry Township, PA, the U.S. Army Tank-Automotive Research, Development & Engineering Center, and Dumur Industries in Canada); the "MMP-8 Mobile Robot Platform"; and the "Crusher", National Robotics Engineering Center, Carnegie Melon University Robotics Institute.

Applicant has designed and tested a band track over wheels design on an FMTV under SBIR Contract No. W56 HZV-04-C-0129.

Among the U.S. patent references considered in preparing this patent application are: U.S. Pat. Nos. 4,445,582; 5,174,405; 4,977,971; 5,248,008; and 6,774,597. The disclosures of these patent references are incorporated herein by reference.

SUMMARY OF THE INVENTION

The invention relates to a multi-purpose ground vehicle that may serve as a platform for carrying a payload. The vehicle has a chassis and a suspension mounted to the chassis for varying ride height and for influencing a response of the chassis to underlying terrain. Track modules are associated with the suspension. Generally elliptical in shape, these modules can be reoriented independently of each other. If a track module is, for example, generally elliptical with an imaginary major axis (A-A), that axis can be displaced arcuately in relation to the major axes that characterize other track modules associated with the vehicle.

If there are four track modules, their orientation can usefully be described in terms of a front pair of track modules and a rear pair of track modules that are separated by a left and a right side of the vehicle. With this frame of reference, if the major axis (A-A) of the track modules on the left side are arcuately displaced toward a vertical position, while those associated with the right side remain in a generally horizontal orientation, the left side of the vehicle becomes elevated in relation to the right side, and thus the vehicle may be able to traverse in a more stable manner across a sloping terrain.

Relatedly, if the major axis (A-A) of all four track modules is oriented vertically, the center of gravity of the chassis will rise and the underbelly clearance between the bottom of the vehicle and the underlying terrain will increase. This enables the vehicle to pass over ground-based object or a debris-strewn terrain.

To supplement the ability of the chassis to be elevated, a suspension is provided that has in one embodiment air springs that underlie the chassis. The air springs have a low pressure state, an intermediate pressure state and a high pressure state. In the high pressure state, the chassis is elevated which, together with the displacement of the major axis (A-A) of the track modules towards a vertical position, further increases the underbelly clearance.

One or more wheels are associated with each of the track modules. Preferably, at least some of the track modules include a band track that circumscribes one or more wheels that are associated with a given track module. At least some of the band tracks can (e.g. describe a generally elliptical path) rotate independently of those associated with other track modules. At least some of the wheels are propelled by means for turning a wheel, such as a drive shaft or suitable gearing or linkages. In one embodiment, means for propelling (such as an electric motor) are operatively connected to the means for turning.

The potential uses of the vehicle include deployment in hazardous environments, border patrol, reconnaissance missions and in search and rescue operations.

DETAILED DESCRIPTION OF THE PREFERRED EMBODIMENT(S)

Figure 1:
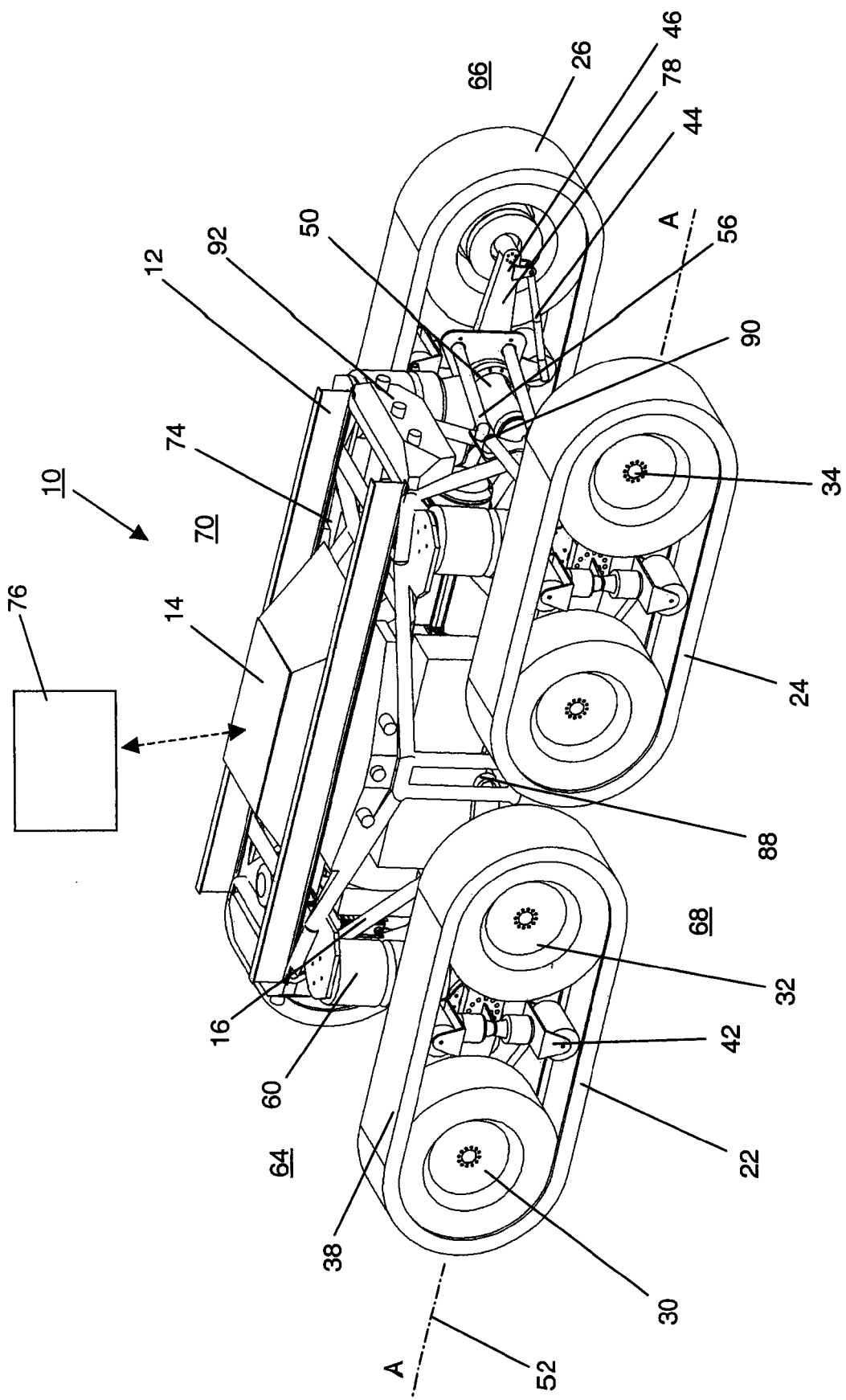
FIG. 1 is a quartering perspective view of a multi-purpose ground vehicle according to one embodiment of the present invention.

In FIGS. 1-5 there is depicted a multi-purpose ground vehicle 10 that may serve as a platform for carrying a payload 14. In one embodiment, the vehicle 10 includes a chassis 16 that is mounted atop a suspension 18 (FIG. 6) for varying ride height and for influencing a response of the chassis 16 to underlying terrain.

A plurality of track modules 22, 24, 26, 28 is associated with the suspension 18. In the embodiment depicted in FIG. 1, there are four track modules 22, 24, 26 and 28 (not shown). It will be appreciated that although four such track modules are depicted, the invention is not so limited. In practice, the invention may include any number of odd or even track modules.

The track modules 22, 24, 26, 28 can be reoriented or rotate independently of each other. As used herein, the term "rotate" in the context of a track module means "displace arcuately" about a fixed center 48 of an associated walking beam 78 (FIGS. 3-5, 7-10). For example, an entire track module may be displaced arcuately about an axis of rotation B-B (FIG. 3) that passes through a rotary actuator 50. Preferably, the rotary actuator 50 is a hydraulic actuator.

In one embodiment, the hydraulic rotary actuators are hydraulic pump-driven actuators that are energized by a diesel engine with a fly wheel housing. In such an embodiment, an accumulated tank is provided for fast response and multiple movements.

In one embodiment (depicted in FIGS. 1, 2 & 3) each track module 22, 24, 26, 28 includes a band track 38 that in an initial state of the vehicle may be considered as generally elliptical. In FIG. 1, the axis (A-A) suggests a major axis 52 of one track module. Thus, under the influence of the rotary actuator 50 (FIG. 3) the module can be displaced arcuately about an axis of rotation (B-B) by a number (n) degrees, where (n) lies between 0 and 360°. In some embodiments, an associated track module may be moved through a number (p) of degrees of arcuate displacement, where (p) equals (m)×(n), where (m) is an integer and (n) lies between 0 and 360°.

Thus, the plurality of track modules 22, 24, 26, 28 can be reoriented independently of each other for altering the height of the chassis 18 above the terrain or for altering a clearance of the chassis beneath an overlying object.

As illustrated, a plurality of wheels 30, 32 is associated with at least some of the plurality of track modules. At least some of the wheels are propelled by means for turning a wheel, such as a drive shaft, or gearing system. Other examples include: an in-hub motor. Connected to the means for turning are means for propelling the means for turning. Examples of the means for propelling are an in-hub motor, a mechanical drive, a gasoline engine, a diesel engine, a fuel cell, one or more electrical batteries, and a torque generator. Other examples include an electric motor or a hybrid system.

Another example of the means for propelling is a diesel engine that is coupled to a high output permanent magnet generator which energizes the in-hub electrical motors associated with the wheels.

Preferably, a band track 38 circumscribes one or more of the plurality of wheels 30, 32 associated with a track module 22, 24, 26, 28. It will be appreciated that the vehicle is able to move without the band track 38 so that it can be propelled or retarded by the wheels 30, 32. In some embodiments, the wheels 30, 32 may accommodate tires 40.

Figure 2:
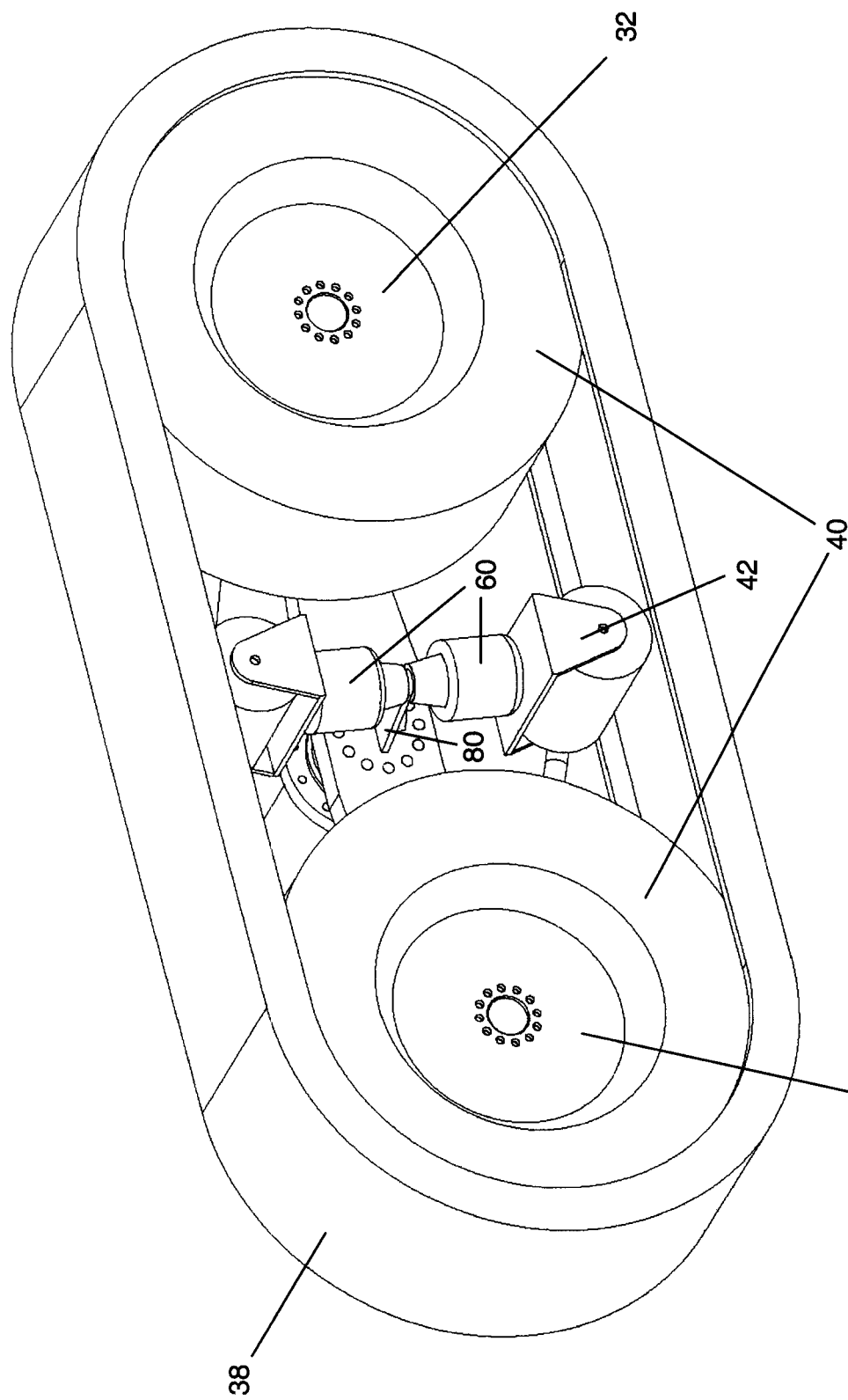
FIG. 2 is a quartering perspective view of an outboard side of an embodiment of a track module.
Figure 3:
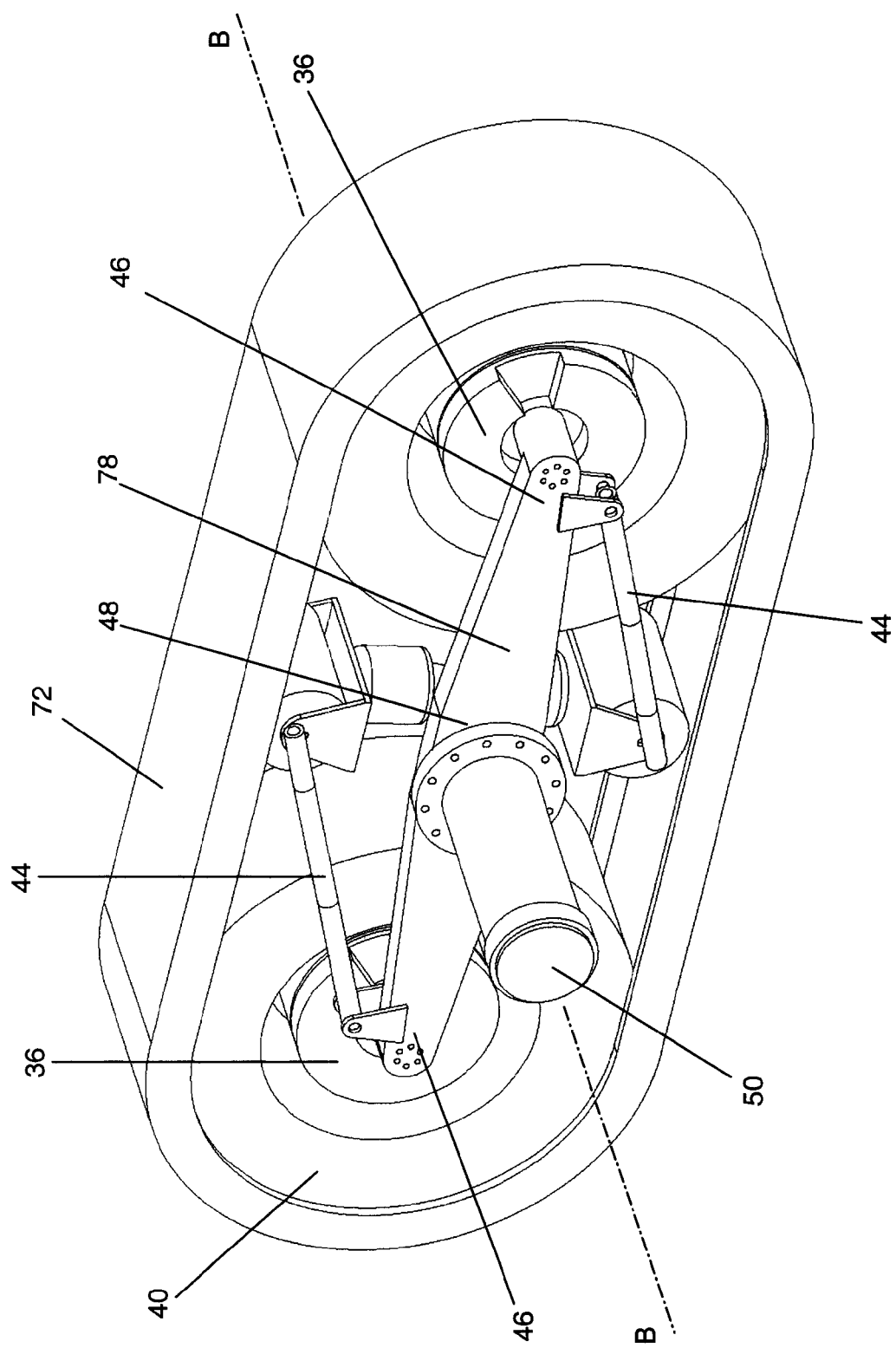
FIG. 3 is a view of the inboard side thereof.
Figure 4:
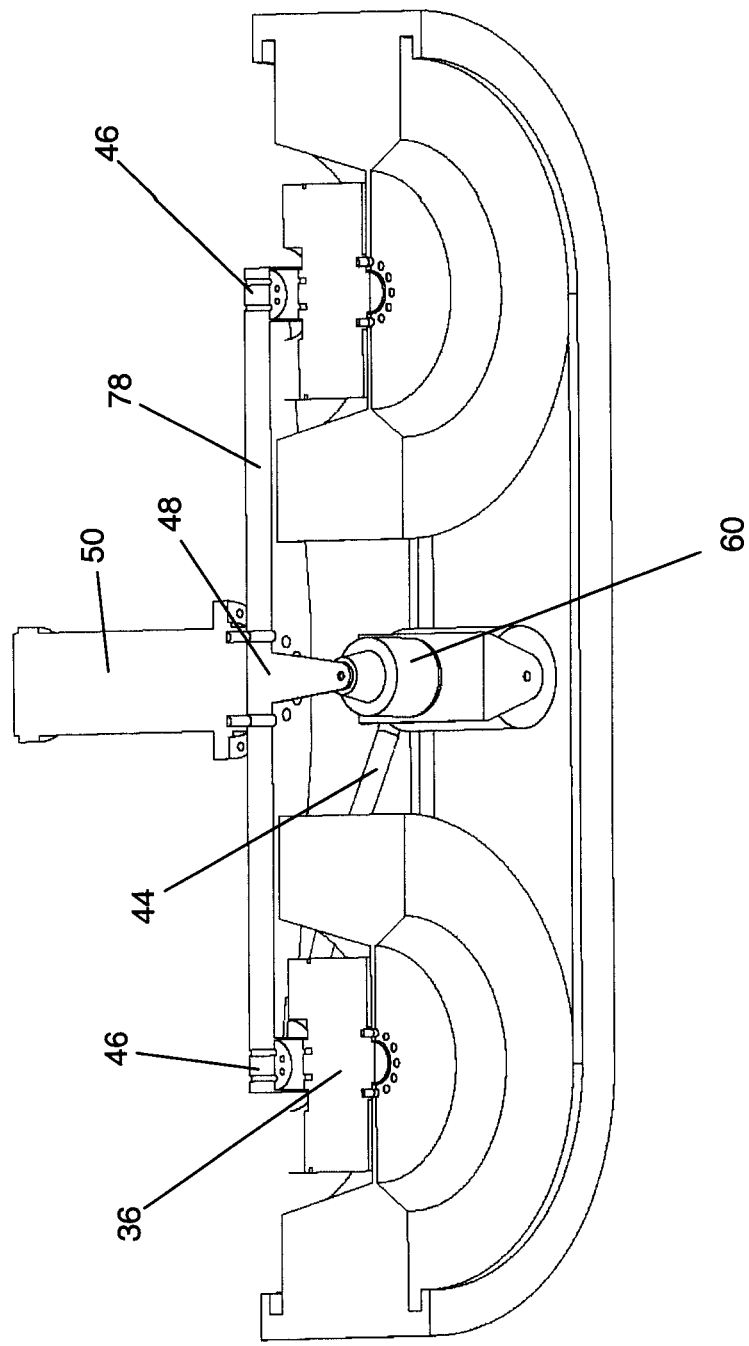
FIG. 4 is a top view of a horizontal section thereof.
Figure 7:
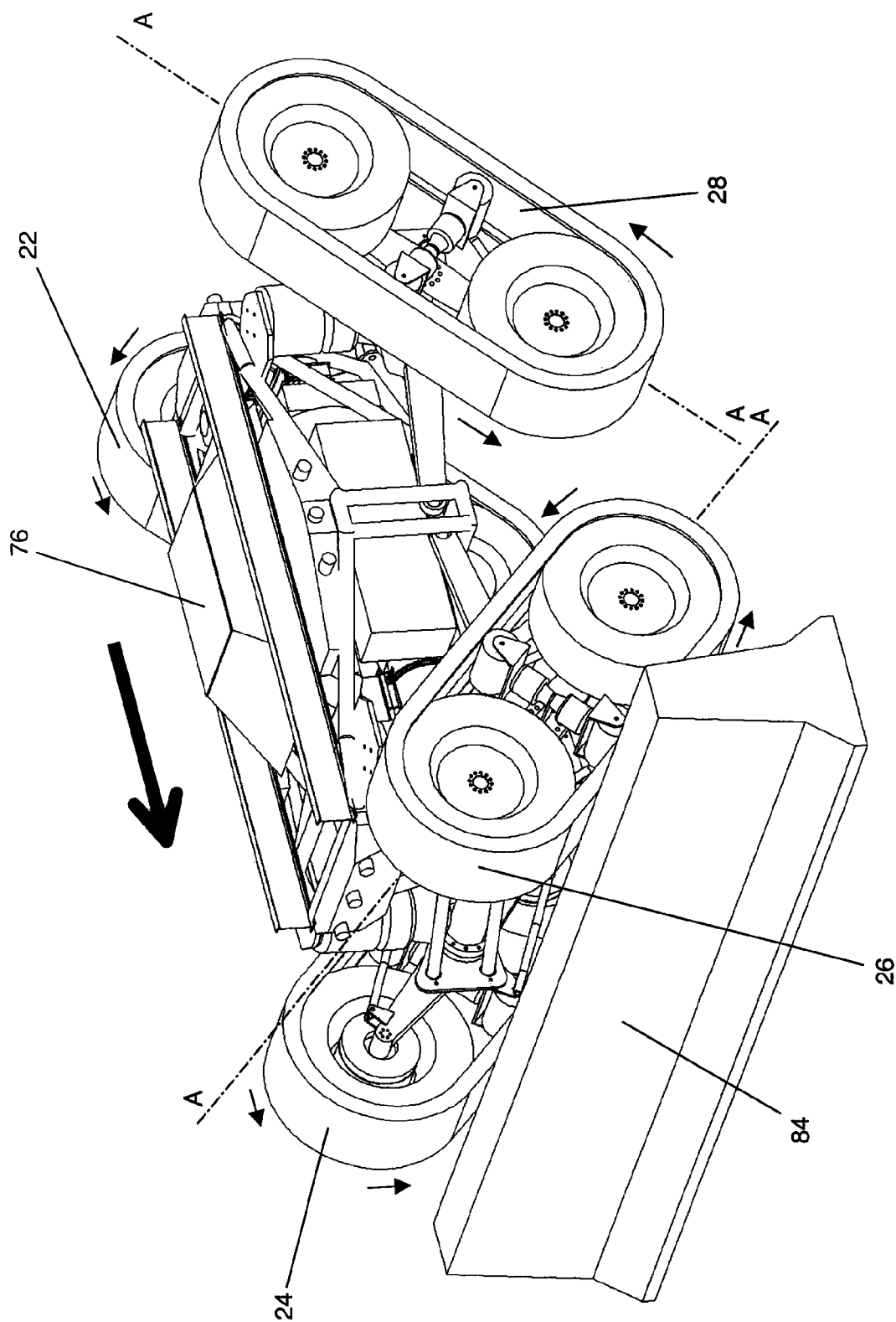
FIG. 7 illustrates one embodiment of the multi-purpose ground vehicle where front and rear track modules have been rotated so that the vehicle may mount and traverse an obstacle.
Figure 8:
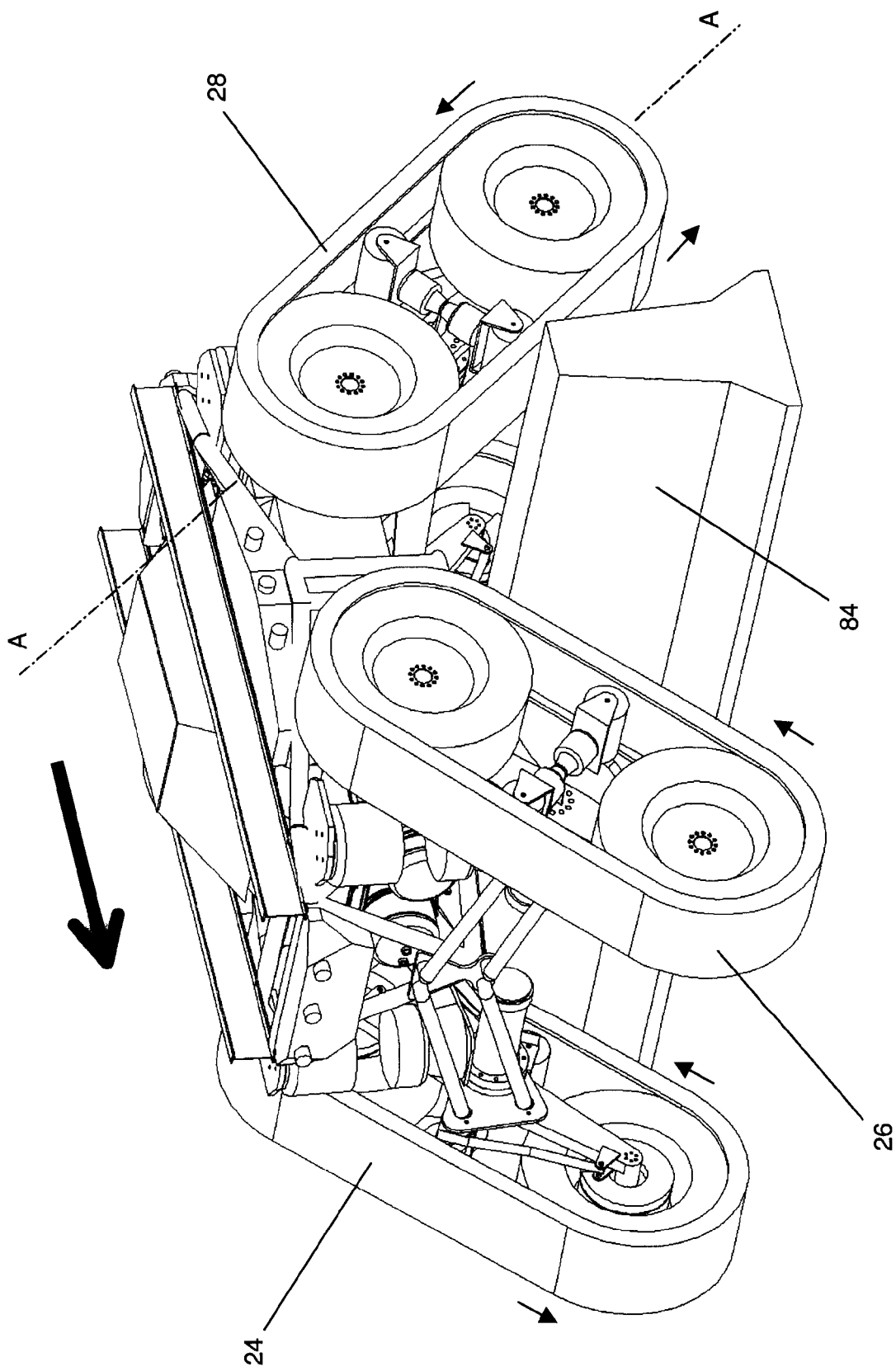
FIG. 8 illustrates one orientation of the vehicle and its associated track modules while bridging the obstacle, in which the front track assemblies have been rotated counter-clockwise (with respect to the view of FIG. 8) and the rear track assemblies have also been moved clockwise with respect to the same frame of reference.

When the vehicle is in some attitudes, such as those depicted in FIGS. 7 and 8, means 42 for tensioning the band track 38 engage the band track 38 for maintaining tension therein, regardless of orientation of the associated track module as it maneuvers over uneven terrain. As best illustrated in FIGS. 2-4, the means 42 for tension include a dual air-spring 60 that extends from opposite sides of an air spring mounting 80 that is fixedly connected to the walking beam 78. Extending from the air spring 60 are castor-like arrangements or idler rollers 90. Under the outward influence of the means for tensioning 42, a relatively constant tension is applied to an inside portion of the associated band track 38.

Figure 5:
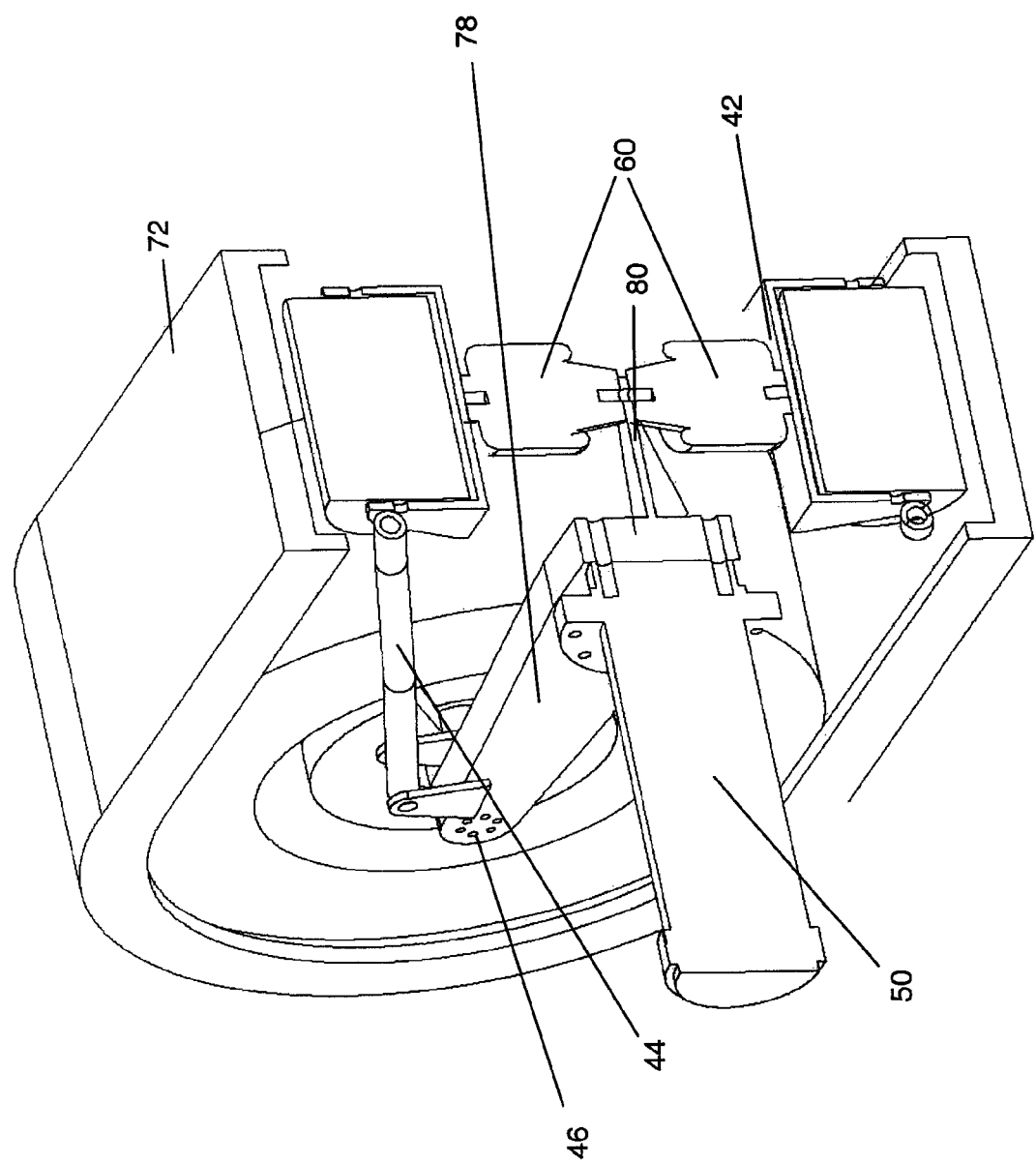
FIG. 5 is a front view of a vertical section thereof.

In FIGS. 3-5, an idler roller linkage arm 44 extends between the means for tensioning 42 and a distal portion 46 of a walking beam 78 having a fixed center 48. A rotary actuator 50 is affixed to the center 48 of the walking beam 78, the rotary actuator 50 serving to displace the distal region 46 of the walking beam 46 arcuately. When this occurs, the linkage arms 44 and the means for tensioning 42 are displaced in response, thereby influencing the direction of force application and amount of tension in the associated band track 38. The actuator 50 therefore allows an associated track module to be reoriented or rotated independently of another track module.

In the embodiment depicted in FIG. 1, there are four hydraulic actuators 50. It will be appreciated that, although not illustrated, the vehicle includes a control system 76 that differentially pressurizes hydraulic lines to which each rotary actuator 50 is connected. The pressure created in those lines is influenced by a pump that may move in response to control signals that may be issued by an on-board or off-board controller. Although hydraulic lines have been disclosed, it will be appreciated that pneumatic lines and pressurized air or gas may also provide suitable energizing forces.

In one embodiment, the overall length of the vehicle may be about 160 inches, while its width may be about 85 inches and the track may be about 13-14 inches wide. Such a configuration may include a wheel-tire and track system that is 32 inches tall when the major axis (A-A) is in a horizontal position in each track module, in which case the nominal ride height would be about 51 inches.

Figure 6:
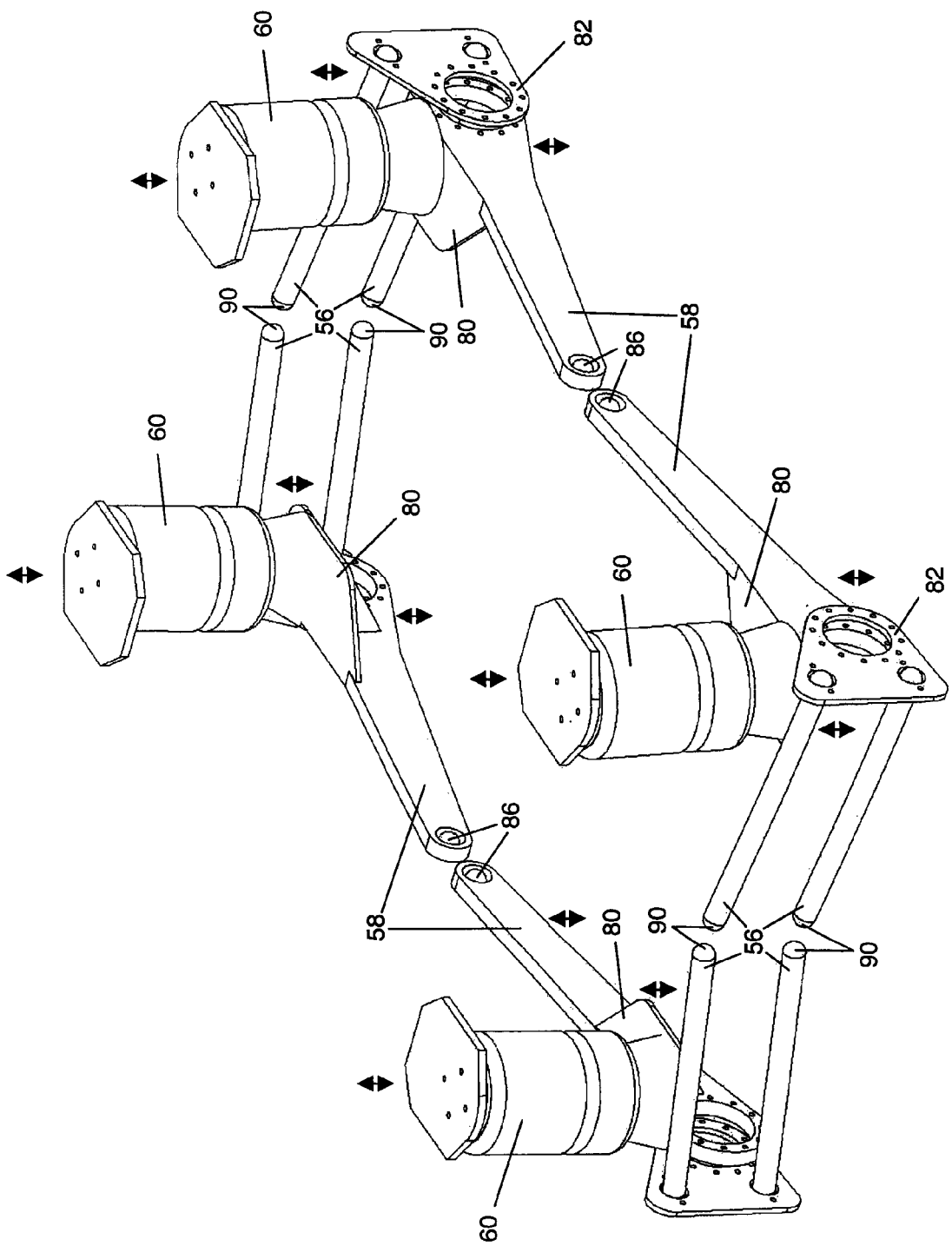
FIG. 6 is an isometric view of a suspension linkage on top of which the chassis of the vehicle is mounted.

Additional details of the suspension 18 are depicted in FIG. 6. The chassis 16 (not shown in FIG. 6) is affixed to the means 60 for springing, such as suspension air springs. In one example, the air bag suspension is provided by Goodyear air bags that are energized by an engine-driven compressor. In one embodiment, a storage tank is provided for active system regulation. In the embodiment depicted, there are four such suspension air springs 60. Each air spring 60 is affixed to an air spring mount 80. In FIG. 6, for orientation, a front portion of the suspension 18 is suggested by the reference numeral 64, and a rear portion by the reference numeral 66. One pair of arms 58 extend rearwardly from the pair of rotary actuator mounts 82 at the front portion 64 of the suspension 18. Another pair of arms 58 extend forwardly from the rotary actuator mounts 82 that are associated with a rear portion 66. Extending laterally and inwardly from the rotary actuator mounts 82 are pairs 56 of radius control arms that influence the lateral separation between the track modules that face each other at the front portion 64 of the vehicle. Similarly for a corresponding set of radius control arms 56 that are located adjacent the rear portion 66 of the vehicle, which serve to maintain a desired separation between the rear track modules.

The suspension illustrated in FIG. 6 has a high, intermediate, and a low pressure state. The high pressure state, in combination with the influence of the rotary actuators 50 urging the band tracks 38 toward a position in which a major axis (A-A, FIG. 1) of the track module 22 toward a vertical orientation, serves to elevate the chassis 16. This enables the platform 12 and associated payload 14 to crawl over an object, as depicted in FIGS. 7-8.

When the suspension 18 is in a low pressure state, the chassis 16 has a low profile and the rotary actuators 50 tends to urge the major axis (A-A) of the band tracks 38 toward a horizontal position, in which the vehicle may be able to crawl under a low overhang or maneuver in a confined tunnel with a low ceiling.

Thus, the suspension 18 in one embodiment is an adjustable air-ride suspension that allows greater speed, varying ride heights, and a low vibration environment for sensors and electronics that may be supported by the platform, together with a variable suspension stiffness.

Returning to FIG. 6, the suspension includes four rotary actuator mounts 82 that secure the suspension 18 to associated rotary actuators 50 (FIG. 3). As mentioned above, one or more radius control arms 56 extend generally laterally and inwardly from the associated rotary actuator mount 82. The arms 58, as noted above, extend generally longitudinally from the associated rotary actuator mount 82 toward the center of the suspension. The ends 86 are secured to the lower portion of posts 88 (FIG. 1) of the chassis 16. Correspondingly, ends 90 of radius control arms 56 are pivotably connected to a frame member 92 at the front and rear of the chassis (FIG. 1).

FIGS. 7 and 8 respectively illustrate possible orientations of track modules before and while navigating over an obstacle 84. In FIG. 7, track modules 24 and 26 encounter an obstacle 84 and have the major axis (A-A, FIG. 1) rotated in a clockwise direction. In concert with such arcuate displacement, the major axis (A-A) of the track modules 22, 28 at the rear of the vehicle are displaced arcuately in a counterclockwise direction. After the front track modules 24, 26 cross the barrier 84, their major axes (A-A) are rotated counterclockwise, while the major axes (A-A) of the rear track modules 22, 28 are displaced in a clockwise direction.

Figure 9:
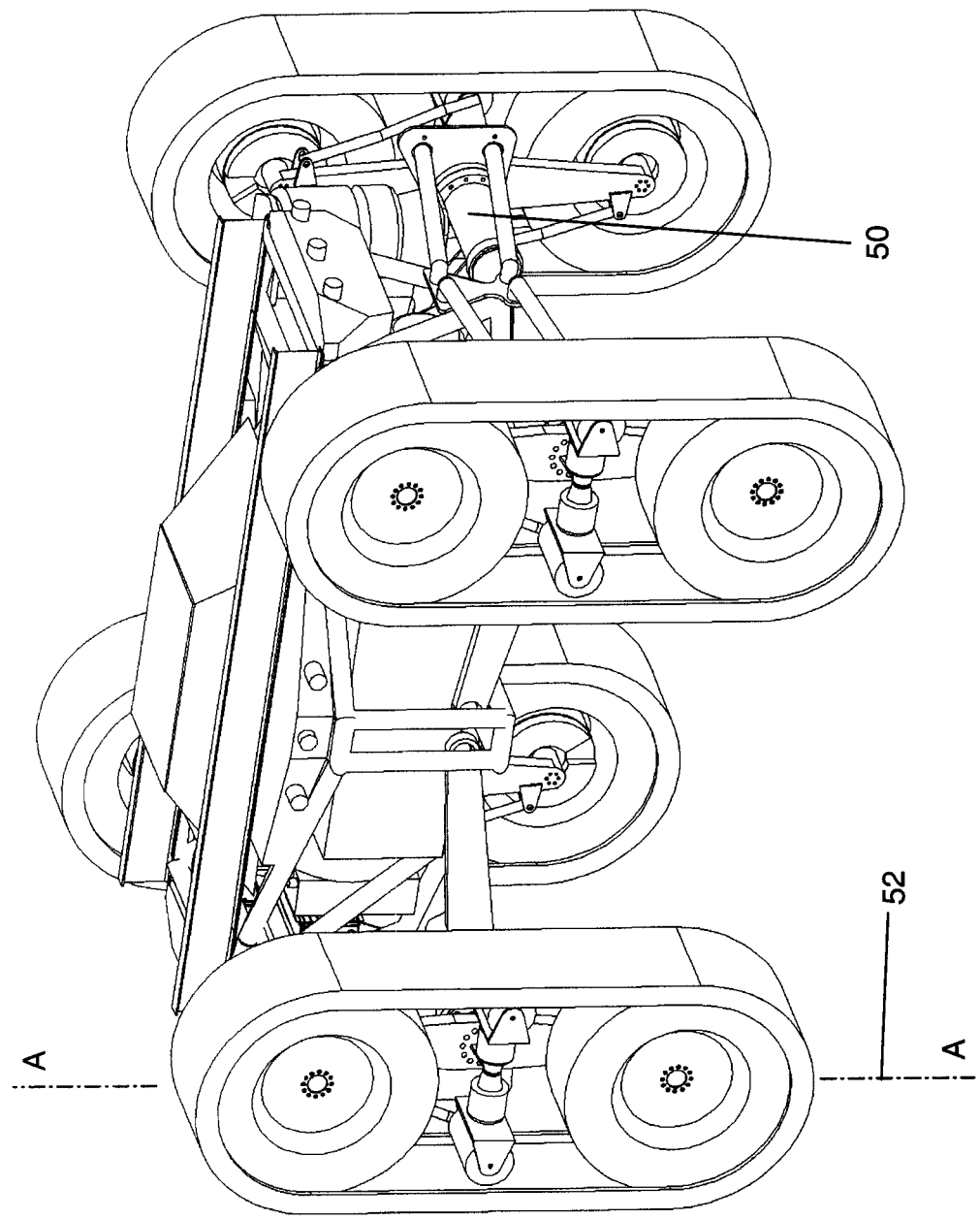
FIG. 9 illustrates an embodiment of the ground vehicle with four track modules, each of which having a major axis that is generally oriented vertically, thereby increasing the underbelly clearance below the chassis.
Figure 10:
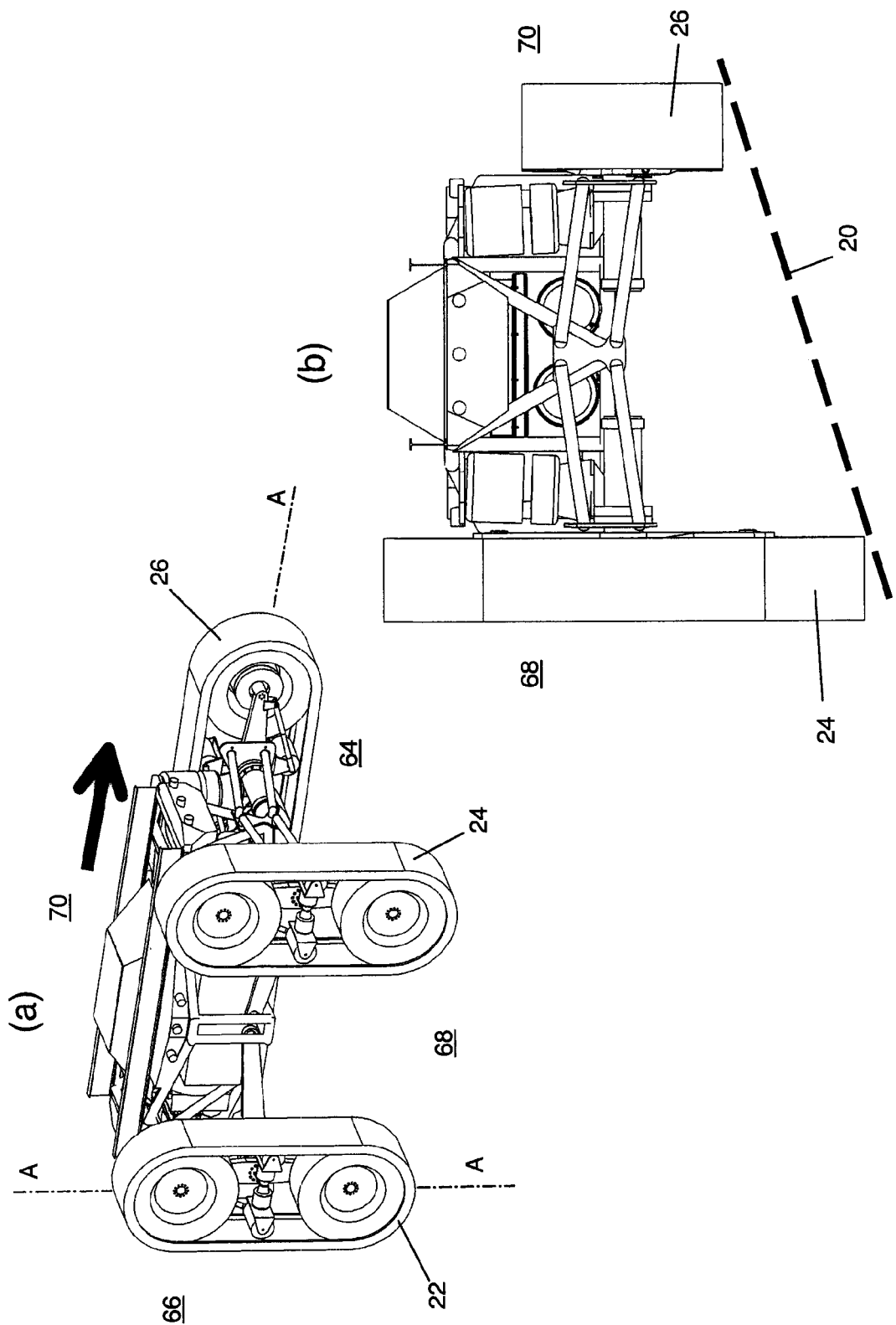
FIGS. 10 a, b respectively illustrate a quartering perspective view and a front view of the vehicle with its track modules oriented so as to promote stability while traversing a sloping terrain.

In FIG. 9, the track modules are illustrated with a major axis A-A in a vertical orientation, in which the underbelly clearance between the chassis and underlying terrain is raised under the influence of the associated rotary actuators 50. Clearance is increased when the means for springing 60 are in a high pressure state.

FIGS. 10(a) and 10(b) illustrate a quarterly perspective and a front view of a vehicle when it traverses a slope 20. In one configuration, the track modules 22, 24 have their major axes (A-A) oriented vertically, while those axes associated with the track modules 26, 28 on the other side of the vehicle are oriented horizontally. When the vehicle is so configured, its tendency to roll over is diminished.

In one embodiment, the platform 12 supports a payload 14 which may include a vision or other sensor system. In some embodiments, the payload 14 (FIG. 1) may be a weapon system, rescue hardware, fire-fighting hardware and hazardous materials handling equipment. It will be appreciated that the payload could include a robot, a human and combinations thereof.

Continuing with reference to FIG. 1, it will be appreciated that in one embodiment a rail system may be provided on the platform 12 which detachably secures the payload 14. The rail system could be provided, in some embodiments, in the form of rails that are formed on the edges of a U-shaped or I-shaped platform 12 that engage wheels or rollers that may be located on the underside of the payload 14. Another alternative might include a chain and sprocket assembly that may operatively interconnect the platform 12 with the payload 14. If desired, a displacement mechanism 74 may be attached to the payload 14 or the rail system for displacing the payload in relation to the rail system, thereby repositioning a center of gravity of a compound body that includes the chassis 12 and the payload 14. For example, in FIG. 8, it may be helpful to have the displacement mechanism 74 shift the payload forwardly so that the center of gravity of the compound body may be moved forwardly while or after the vehicle crosses the obstacle 84.

As illustrated in FIG. 1, a control system 76 may be provided that is in communication with the displacement mechanism 74 for sending a signal to the displacement mechanism 74 in response to which the payload 14 may move in relation to the track system.

It will be appreciated that the control system 76 may also comprehend a remote control system whereby the vehicle may be maneuvered by a ground-based or aerial-based operator. In some embodiments, the control system 76 may include circuitry that interconnects with a vehicle-based global positioning system (GPS). If so, a remote operator could send a signal to the vehicle so that it may be navigated from point X to point Y along a pre-determined route.

If desired, an infrared or similar sensor may be provided on the platform 12 or the payload 14. Appropriate signals could then be generated and communicated that are indicative of the distance of the vehicle 10 from a barrier 84. When the vehicle 10 impacts the barrier 84, some slippage may be expected to occur, either between the band tracks 38 and the terrain 20 and/or between the wheels 30, 32 and the associated band tracks 38. In such circumstances, when certain conditions are met, a signal may be communicated to the hydraulic actuators 50 so that they may move the major axes (A-A) by a certain number of degrees. Then, an interrogation signal could determine whether or not such arcuate displacement has produced forward motion of the vehicle. If not, the amount of arcuate displacement could be increased and a higher tractive force imparted through the in-hub electric motors (means for propelling 36).

Such features are illustrative of those that could be included in an instrumentation sensor suite. But it will also be appreciated that the invention need not be so equipped. Comparable functions could also be initiated by a human being, either remotely or through signals communicated along an umbilical cord. Other features that could be included in an instrumentation suite associated with a control system 76 are an inclinometer that may sense a side slope, or uneven terrain.

The vehicle may include vision systems sensors that may be placed at multiple locations on the platform 12 or chassis 16. A battery box may also be associated with the chassis for accommodating one or more on-board batteries that energize on board systems and in-hub electric motors. If desired, coolers may be provided if the operating temperatures of some components rise out of tolerance.

In one embodiment, the disclosed vehicle has the following major components which respectively weigh:

| Component | Weight (lbs) |
|---|---|
| 1-4 Diesel engine & sub-systems | 900 |
| 120 kW DC generator | 220 |
| 4 wheel motors | 160 |
| Controllers | 100 |

-continued

| Component | Weight (lbs) |
|---|---|
| Hydraulic pump and 4 rotary actuators | 600 |
| Batteries | 500 |
| Wheels | 400 |
| Tracks | 750 |
| Frame & suspension | 1100 |
| Body | 250 |
| Tensioner airbags | 21 |
| Suspension airbags | 35 |
| Fuel Tanks & fuel | 150 |
| Total | 5186 |

Below is a summary of various features of one embodiment of the disclosed vehicle in relation to comparable features of prior art approaches:

| Feature | FCS MULE | TAGS-CX | Estimated HMUGV |
|---|---|---|---|
| Vehicle Purpose | Fighting Vehicle/ Silent Recon | General Purpose UGV | High Mobility, High Speed, High Payload UGV |
| Vehicle weight (lbs) | 5000 | 3400 | 5500 |
| Payload capacity (lbs) | 1900 | 2400 | 3000 |
| Top speed (mph) | 32 | 25 | 50 |
| Grade climb | 60% | NA | 60% |
| Side slope | 40% | NA | 40% |
| Step climb (in) | 20 | NA | 40 |
| Gap cross (in) | 28 | NA | 40 |
| Fording depth (in) | 30 | NA | 42 |
| Length (in) | 180 | 118 | 157 |
| Width (in) | 84 | 75 | 85 |
| Height (in) | 96 | 45 | 51 |
| Engine | Diesel | 60 HP turbo diesel | 142 HP diesel turbo |
| Drive type | Electric hub motors | Hydraulic motors | Electric hub motors |

In one embodiment, a power train of the vehicle includes a Caterpillar inline 4 cylinder diesel engine that produces 140 horsepower and 400 lb-ft of torque that powers a permanent magnet generator. If desired, a UQM power phase 120 generator can be provided that produces 120 kw of peak power, 75-100 kw continuous and 250-400 volts direct current that is attached to the fly wheel housing of the diesel engine. The generator has a liquid-cooled controller that outputs a direct current voltage.

If desired, a cooling system can be provided which includes a large generator that cools an engine and/or small radiators for cooling electronic components.

In one embodiment, the wheel motors (one motor per wheel set) are provided by PML Flightlink. The PML Flightlink drive controllers are able to control multiple drives, provide braking controls, CAN US communication capable. This allows smooth control, even at low speeds.

Thus, there has been disclosed a high mobility manned or unmanned ground vehicle platform that utilizes the benefits of both a tracked vehicle and a wheeled vehicle. With the help of an hydraulic actuator and a walking arm, the track system can rotate between a horizontal position and a vertical position and through any intermediate angle that might be helpful in climbing barriers and obstacles. Track tensioning devices associated with a given track module act in both directions. If the track is broken, the vehicle may ride on the wheels alone. In a low profile orientation, the vehicle can crawl under a 3.5 foot object. In a high profile orientation, the platform can crawl over a 3.6 foot object.

The reference numerals listed are used throughout the specification:
10 ground vehicle
12 platform
14 pay load
16 chassis
18 suspension
20 terrain
22 track module 41)
26 track module (3)
24 track module (2)
28 track module (4)
30 wheel (1)
32 wheel (2)
34 means for turning
36 means for propelling
38 band track
40 tire
42 means for tensioning
44 idler roller linkage arm
46 distal portion of walking beam
48 fixed center (of 46)
50 rotary actuator
52 major axis (A-A)
54 radius control arm
56 radius conirol arm
58 arm
60 means tor springing
62 vision system sensor
64 from portion
66 rear portion
68 opposing side portions (R)
70 opposing side portions (L)
72 track system
74 displacement mechanism
76 control system
78 walking beam
80 air spring mount
82 rotary actuator mount
84 obstacle
86 pivot points of 58
88 posts of chassis
90 pivot points of 56
92 frame member While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multipurpose ground vehicle that may serve as a platform for carrying a payload, the vehicle comprising:
   a chassis;
   a suspension mounted to the chassis for varying ride height and for influencing a response of the chassis to underlying terrain, the suspension comprising:
      a rotary actuator mount for securing the suspension to a rotary actuator,
      one or more radius control arms extending generally laterally from the rotary actuator mount,
      an arm extending generally longitudinally from the rotary actuator mount, and
      means for springing extending upwardly from the rotary actuator mount;

a plurality of track modules associated with the suspension that can rotate independently of each other for altering the height of the chassis above the terrain or a clearance of the chassis beneath an overlying object;

one or more wheels associated with at least some of the plurality of track modules, at least some of the one or more wheels being propelled by means for turning a wheel;

means for propelling the means for turning;

a band track associated with at least some of the track modules, the band track circumscribing the one or more wheels associated with a track module, the vehicle being able to move without the band track so that it is propelled or retarded by interaction between the wheels and the terrain;

means for tensioning the band track that engages the band track for maintaining tension in the band track regardless of orientation of the associated track module as it maneuvers over uneven terrain;

an idler roller linkage arm associated with at least some of the track modules, the arm extending between the means for tensioning and a distal portion of a walking beam having a fixed center; and the rotary actuator associated with at least some of the track modules, the rotary actuator being affixed to the center of the walking beam, the rotary actuator serving to displace the distal region of the walking beam arcuately, the linkage arm and the means for tensioning being displaced in response, thereby influencing tension in the band track, the rotary actuator also allowing an associated track module to be rotated independently of another track module;

wherein the rotary actuator is configured to displace an associated track module arcuately through 360 degrees.

2. The vehicle of claim 1, wherein the suspension has a high pressure state and a low pressure state, the high pressure state elevating the chassis and the rotary actuator urging the band tracks toward a position in which a major axis of the track module moves toward a vertical orientation, thereby enabling the platform to crawl over an object, the low pressure state lowering the chassis and the rotary actuator urging the major axis of the band tracks toward a horizontal position that enables the vehicle to crawl under an object.

3. The vehicle of claim 1, further comprising a payload attached to the chassis, the payload being selected from the group consisting of a weapons system, rescue hardware, fire-fighting hardware and hazardous materials handling equipment.

4. The vehicle of claim 1, wherein the payload is selected from the group consisting of a robot, a station for a human and combinations thereof.

5. The vehicle of claim 1, wherein the suspension is an air-ride suspension.

6. The vehicle of claim 1, wherein the vehicle has a front portion, a rear portion and a pair of opposing side portions that extend between the front and rear portions, the arms associated with the rotary actuators at the front of the chassis extending rearwardly from the front portion and the arms associated with the rear portion extending forwardly from the rear portion.

7. The vehicle of claim 1, wherein the rotary actuator is configured to displace an associated track assembly arcuately through more than 360 degrees.

8. The vehicle of claim 1, wherein the means for propelling is selected from the group consisting of a motor, a mechanical drive with a drive shaft, a gasoline engine, a diesel engine, a fuel cell, one or more electrical batteries, an electric motor, a hybrid system and a torque generator.

9. The vehicle of claim 1, wherein the rotary actuator is selected from a group consisting of an electric motor and a hydraulic actuator.

10. The vehicle of claim 1, further including:
a track system attached to the chassis, the track system detachably securing the payload;
a displacement mechanism attached to the payload for displacing the payload in relation to the track system, thereby repositioning a center of gravity of a compound body including the chassis and the payload.

11. The vehicle of claim 10, further including a control system in communication with the displacement mechanism for sending a signal to the displacement mechanism in response to which the payload may move in relation to the track system.

12. The vehicle of claim 1 wherein the means for tensioning the band track has a first tensioner and a second tensioner, the first tensioner positioned adjacent to the center of the walking beam, and the second tensioner positioned adjacent to the center of the walking beam and opposed to the first tensioner.

* * * * *